United States Patent
Williams et al.

(10) Patent No.: US 9,718,529 B2
(45) Date of Patent: Aug. 1, 2017

(54) TRANSMISSION FOR MARINE PROPULSION

(71) Applicant: Brunswick Corporatioin, Lake Forest, IL (US)

(72) Inventors: Cameron Philip Williams, Dexter, MI (US); Carl David Schleuder, Novi, MI (US); Jefferey R. Ziemba, Novi, MI (US)

(73) Assignee: Brunswick Corporation, Lake Forest, IL (US)

( * ) Notice: Subject to any disclaimer, the term of this patent is extended or adjusted under 35 U.S.C. 154(b) by 76 days.

(21) Appl. No.: 14/850,140

(22) Filed: Sep. 10, 2015

(65) Prior Publication Data

US 2015/0375841 A1  Dec. 31, 2015

Related U.S. Application Data

(63) Continuation-in-part of application No. 13/833,117, filed on Mar. 15, 2013, now abandoned.

(51) Int. Cl.
| | |
|---|---|
| *F16D 23/06* | (2006.01) |
| *F16H 23/02* | (2006.01) |
| *B63H 23/02* | (2006.01) |
| *B63H 23/30* | (2006.01) |
| *F16H 3/50* | (2006.01) |
| *F16H 3/68* | (2006.01) |
| *F16H 48/08* | (2006.01) |

(52) U.S. Cl.
CPC ............. *B63H 23/30* (2013.01); *B63H 23/02* (2013.01); *F16D 23/06* (2013.01); *F16H 3/50* (2013.01); *F16H 3/68* (2013.01); *B63H 2023/0283* (2013.01); *F16D 2023/0681* (2013.01); *F16H 48/08* (2013.01); *F16H 2200/2094* (2013.01)

(58) Field of Classification Search
CPC .. F16D 23/06; F16D 2023/0681; F16H 48/08; B63H 2023/0283
See application file for complete search history.

(56) References Cited

U.S. PATENT DOCUMENTS

| | | | | |
|---|---|---|---|---|
| 1,350,324 | A | * | 8/1920 | MacMillan ............... F16H 3/60 475/309 |
| 3,994,254 | A | | 11/1976 | Woodfill |
| 4,086,826 | A | | 5/1978 | Von Kaler |
| 4,150,590 | A | | 4/1979 | Hurst |
| 4,173,939 | A | | 11/1979 | Strang |
| 4,323,354 | A | | 4/1982 | Blanchard |
| 4,331,432 | A | | 5/1982 | Blanchard |
| 4,343,612 | A | | 8/1982 | Blanchard |
| 4,400,163 | A | | 8/1983 | Blanchard |

(Continued)

*Primary Examiner* — Ramya Burgess
*Assistant Examiner* — David Morris
(74) *Attorney, Agent, or Firm* — Andrus Intellectual Property Law, LLP (57) ABSTRACT

A marine transmission located within drive housing includes a torque transmitting gear set and a clutch mechanism. The torque transmitting gear set includes top and bottom bevel gears and opposing side idler bevel gears mounted to a pinion shaft. The pinion shaft is mounted on a carrier and the clutch mechanism engages the carrier to rotate with the input shaft to drive the output shaft in the forward direction and engages the carrier to a reaction plate fixed to the drive housing to drive the output shaft in the reverse direction.

13 Claims, 7 Drawing Sheets

(56) References Cited

U.S. PATENT DOCUMENTS

| | | |
|---|---|---|
| 4,805,755 A | 2/1989 | Fukumoto et al. |
| 5,009,621 A | 4/1991 | Bankstahl et al. |
| 5,085,303 A | 2/1992 | Frost |
| 5,152,725 A | 10/1992 | Shank, Jr. |
| 5,394,764 A | 3/1995 | Fini, Jr. |
| 5,711,742 A | 1/1998 | Leinonen et al. |
| 6,027,424 A | 2/2000 | Reynolds |
| 6,350,165 B1 | 2/2002 | Neisen |
| 6,435,923 B1 | 8/2002 | Ferguson |
| 6,554,663 B2 | 4/2003 | Neisen |
| 6,582,259 B1 | 6/2003 | Mansson et al. |
| 6,588,563 B1 | 7/2003 | Sarrach et al. |
| 6,960,107 B1 | 11/2005 | Schaub et al. |
| 6,966,805 B1 | 11/2005 | Caldwell |
| 7,291,048 B1 | 11/2007 | Phillips et al. |
| 7,318,761 B1 | 1/2008 | Mansfield et al. |
| 7,361,069 B2 | 4/2008 | Mansfield et al. |
| 7,544,110 B1 | 6/2009 | Phillips et al. |
| 7,704,108 B2 | 4/2010 | Oguma et al. |
| 7,704,183 B2 | 4/2010 | Nakamura et al. |
| 7,727,037 B2 | 6/2010 | Fukuoka et al. |
| 7,762,858 B2 | 7/2010 | Suzuki et al. |
| 7,762,859 B2 | 7/2010 | Suzuki et al. |
| 7,798,874 B2 | 9/2010 | Fukuoka |
| 7,811,141 B2 | 10/2010 | Fukuoka |
| 7,892,056 B2 | 2/2011 | Okabe et al. |
| 7,909,670 B2 | 3/2011 | Suzuki et al. |
| 7,931,511 B2 | 4/2011 | Suzuki et al. |
| 7,931,513 B2 | 4/2011 | Suzuki et al. |
| 7,934,964 B2 | 5/2011 | Fukuoka |
| 7,942,712 B2 | 5/2011 | Suzuki et al. |
| 8,047,885 B2 | 11/2011 | Nakamura et al. |
| 8,157,694 B2 | 4/2012 | Nakamura et al. |
| 9,133,910 B1 * | 9/2015 | VanSelous ............ F16D 23/04 |
| 2005/0202734 A1 | 9/2005 | Miller |
| 2007/0125192 A1 | 6/2007 | Mowbray et al. |
| 2007/0199792 A1 | 8/2007 | Aschauer |
| 2010/0248565 A1 | 9/2010 | Okabe et al. |

* cited by examiner

TRANSMISSION FOR MARINE PROPULSION

CROSS-REFERENCE TO RELATED APPLICATIONS

This application claims the benefit of and priority to U.S. Provisional patent application Ser. No. 13/833,117, filed Mar. 15, 2013, which is hereby incorporated by reference in entirety.

FIELD OF THE DISCLOSURE

The present disclosure is generally related to marine transmissions and more particularly to a forward, neutral and reverse transmission having a torque transmitting gear set with opposing pairs of bevel gears.

BACKGROUND OF THE DISCLOSURE

Those skilled in the art of marine propulsion systems are aware of many different types of transmissions that are used to shift marine drives between forward, neutral and reverse positions. In single propeller systems, it is common to locate facing forward and reverse bevel gears in the propeller housing at a lower right angle connection between the vertical drive shaft and the propeller shaft with a clutch mechanism in the propeller housing shifting between neutral, forward and reverse positions. In dual counter-rotating propeller systems, however, the two facing bevel gears in the propeller housing are each fixed to a respective propeller and shifting between forward, neutral, and reverse positions must take place upstream in the torque path. In dual propeller stern drive arrangements, the forward and reverse functions are often accomplished at the upper right angle connection in the stern drive housing between the engine output shaft and the top end of the vertical drive shaft. This means of shifting between forward, neutral and reverse is not available, however, when one employs dual-counter rotating propellers in an outboard motor.

The present disclosure provides an in-line forward, neutral and reverse transmission that can be located on the vertical drive shaft upstream of the lower right angle gear connection in the propeller housing of a marine drive. Such an in-line transmission has the potential to simplify the construction of single propeller and dual propeller outboard motors as well as other types of marine drives. It is desirable that such an in-line transmission be efficient and robust, and have relatively low inertia and weight. Many of the options for locating the forward, neutral and reverse function upstream of the propeller housing in outboard motors rely on complex planetary transmissions or wet clutches that are relatively inefficient, heavy, bulky and expensive. Lay shaft or counter-rotating shaft arrangements with gearing or chain drives are viable but have been found to be too large and complex for some applications.

SUMMARY OF THE DISCLOSURE

A transmission for a marine propulsion system constructed in accordance with a desired embodiment of the invention located in-line with the vertical drive shaft within the drive housing of either an outboard motor or a stern drive unit, and is capable of shifting between forward, neutral and reverse positions. The transmission transmits torque from an input drive shaft that receives torque from the engine crankshaft to an output shaft that transmits torque to the lower right angle connection in the propeller housing. The transmission includes a torque transmitting gear set that is mounted within and to a carrier. A pinion shaft is mounted to the carrier transverse to the axis of rotation of the input and output shafts. Opposing top and bottom bevel gears are mounted in line with the input and output shafts with the top bevel gear being fixed to the input shaft and the bottom bevel gear being fixed to the output shaft. Opposing side idler bevel gears are mounted on the pinion shaft transverse to the top and bottom bevel gears and in constant mesh with the top and bottom bevel gears.

A clutch mechanism engages the carrier for operation in a forward, neutral or reverse position. When in the forward position, the carrier is engaged for common rotation with the input shaft. In the reverse position, the carrier is engaged to remain in a fixed position relative to the drive housing. A shifting mechanism, such as a power-assisted shifting fork, shifts the clutch mechanism between forward, neutral and reverse positions. When the clutch mechanism is shifted into the forward position with the carrier fixed to rotate in common with the input shaft and top bevel gear, the pinion shaft also rotates in common with the input shaft. Consequently the side idler bevel gears do not rotate about the pinion shaft; rather the top bevel gear and the pinion shaft drive the side idler gears to orbit about the rotation axis of the input shaft such that the side idler gears drive the bottom bevel gear and the output shaft to rotate in the same direction as the input shaft at a 1:1.0 ratio. When the clutch mechanism is shifted into the reverse position, however, the carrier is fixed relative to the drive casing such that the top bevel gear on the input shaft rotates the side idler bevel gears about the pinion shaft. This causes the side idler bevel gears to drive the bottom bevel gear and output shaft in the reverse direction of the input shaft. When the clutch is shifted into the neutral position, the carrier is not engaged and the output shaft is able to rotate freely relative to the input shaft. In neutral, the carrier rotates to accommodate differences in the angular velocities of the input and output shafts.

It is desired that needle bearings and thrust bearings be used in the torque transmitting gear set to accommodate the rigors of marine propulsion. Compared to other types of in-line forward, neutral and reverse transmissions for marine propulsion, the desired transmission is radially compact and mechanically robust.

It is desired that the clutch mechanism is located vertically above the torque transmitting gear set. It is further desired that the carrier be comprised of a carrier body and a carrier flange that is permanently connected to the carrier body and arranged to extend completely around the input shaft. The clutch mechanism engages the carrier flange to rotate in common with the input shaft when the clutch mechanism is shifted into the forward position. When the clutch is in the reverse position, the clutch mechanism engages the carrier flange to remain in a fixed position with respect to a grounded torque reaction plate. The grounded torque reaction plate in turn is fixed directly or indirectly to the drive housing and the position of the grounded torque reaction plate relative to the drive housing is fixed.

The desired clutch mechanism is a synchronizing clutch mechanism, similar in some respects to automotive-type synchronizers. The use of a synchronizer has the advantage of proving relatively smooth shifting. Also, synchronizers are known to be robust and durable. To implement the use of a synchronizing clutch mechanism, the system includes a forward hub fixed for common rotation with the input shaft. The forward hub includes a friction cone and clutch engagement teeth. The grounded reaction plate, as well, includes a friction cone and clutch engagement teeth. A synchronizer hub is mounted for common rotation with the carrier flange, for example spline mounted on the carrier flange. The synchronizer hub is located between the forward hub and the grounded reaction plate, but does not move axially along the carrier flange. The synchronizer hub includes concentric wells on both sides (i.e., top side and bottom side when the transmission is oriented vertically) to hold the synchronizer blocker rings and synchronizer friction rings. The outer circumferential surface of the synchronizer hub also includes a splined surface. A sliding sleeve is mounted over the splined surface on the synchronizer hub, and rotates in common with the hub but is movable axially between the neutral position to the forward position and between the neutral position and the reverse position. When shifting into the forward position, friction rings engage the friction cone on the forward hub to synchronize rotation of the carrier flange with the rotation of the input shaft and allow the blocker ring to release, and then the shifting force slides the sleeve to engage the clutch engagement teeth on the forward hub. While shifting power is necessary to shift the synchronizer, once the sleeve engages the teeth shifting power is not required. When shifting into the reverse position, the friction rings engage the friction cone on the grounded reaction plate to hold the carrier flange still with respect to the grounded reaction plate and allow the blocker ring to release, and the shifting force slides the sleeve to engage the clutch engagement teeth on the grounded reaction plate.

DETAILED DESCRIPTION

Figure 1:
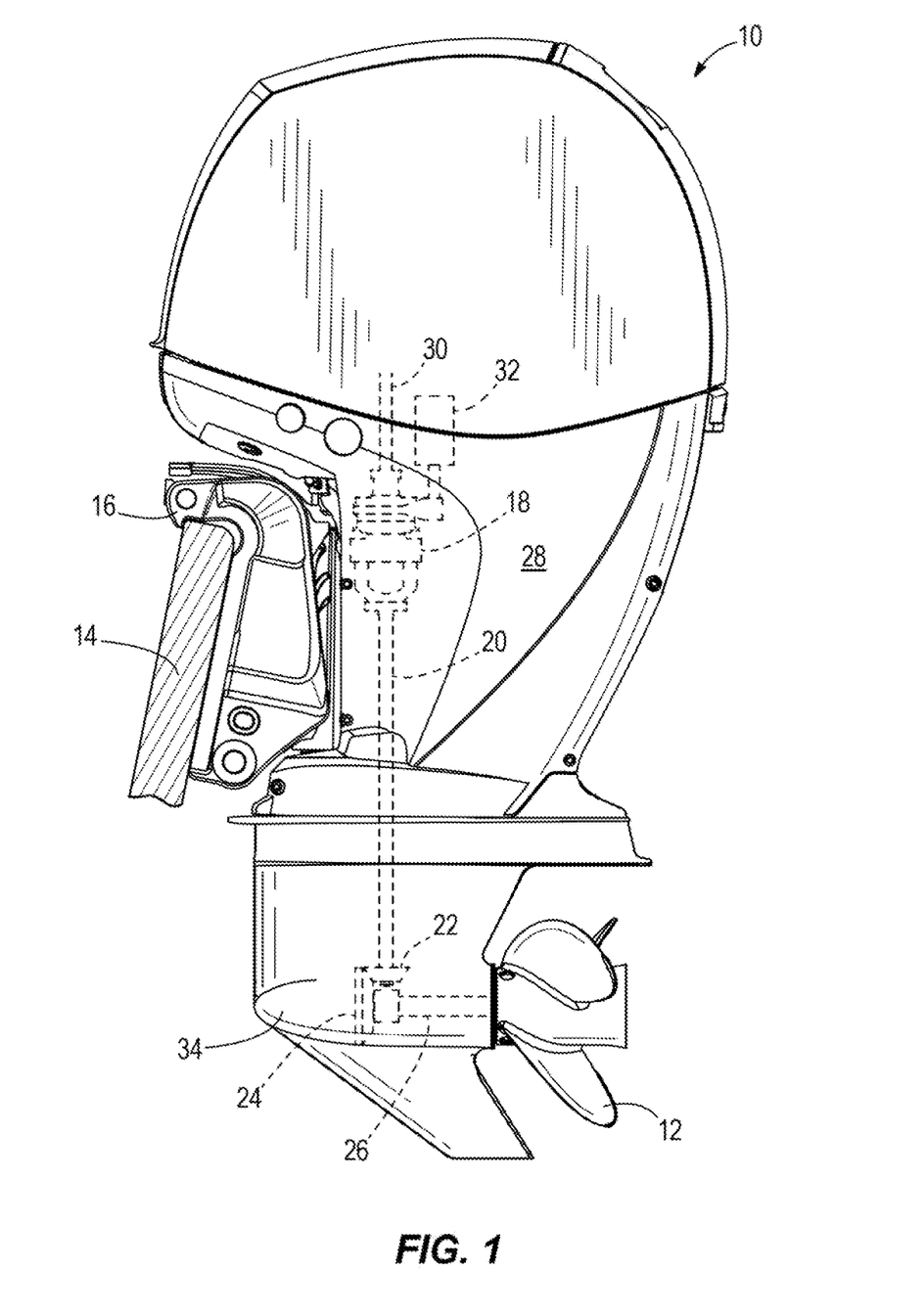
FIG. 1 is a schematic view of an exemplary outboard motor that includes a marine propulsion system constructed in accordance an embodiment of the invention.

FIG. 1 shows an outboard motor 10 with a single propeller 12. The outboard motor 10 is mounted to a transom 14 of a boat with a transom bracket 16 as is known in the art. In FIG. 1, a marine transmission 18 is shown in phantom located within the drive housing 28. An input drive shaft 30 receives torque and is rotated by a combustion engine as is known in the art. The transmission 18 receives the input drive shaft 30 and drives an output shaft 20 which is aligned along a common axis of rotation as the input drive shaft 30. The output shaft 20 in turn is connected via bevel gears 22, 24 at a lower right angle connection to a horizontal propeller shaft 26. In accordance with the illustrated embodiment of the invention, the bevel gears 22, 24 are in constant mesh. An electromechanical actuator 32 is used to shift the transmission 18 between forward, neutral and reverse positions. When the transmission 18 is in the forward position, the output shaft 20 rotates in the same direction as the input drive shaft 30. While not preferred, it is theoretically possible, depending on the arrangement of the bevel gears 22, 24 in the propeller housing 34, to design the transmission 18 so that the output shaft 20 rotates in the opposite direction as the input drive shaft 30 when in the forward position. For durability and efficiency reasons, however, it is much preferred that the output shaft 20 rotate in the same direction as the input drive shaft 30 when the transmission 18 is in the forward position. In addition, the transmission 18 as shown in FIG. 1 illustrates use in connection with a single propeller. Those skilled in the art will understand that the transmission may be used in connection with dual propeller applications as well. In either case, one of the primary advantages using the transmission 18 re-locate the forward, neutral, reverse shifting upstream in the drive train from the propeller housing.

When the transmission is used with an outboard motor, the input drive shaft 30, transmission 18 and the output shaft 20 should be arranged vertically in the drive housing 28 as shown in FIG. 1. However, the transmission 18 may be used in a stern drive as well. It is possible in a stern drive that the transmission 18 be located on a horizontal span of the drive train, although the transmission 18 is particularly well suited for use in a substantially vertical portion of the drive train.

Figure 2:
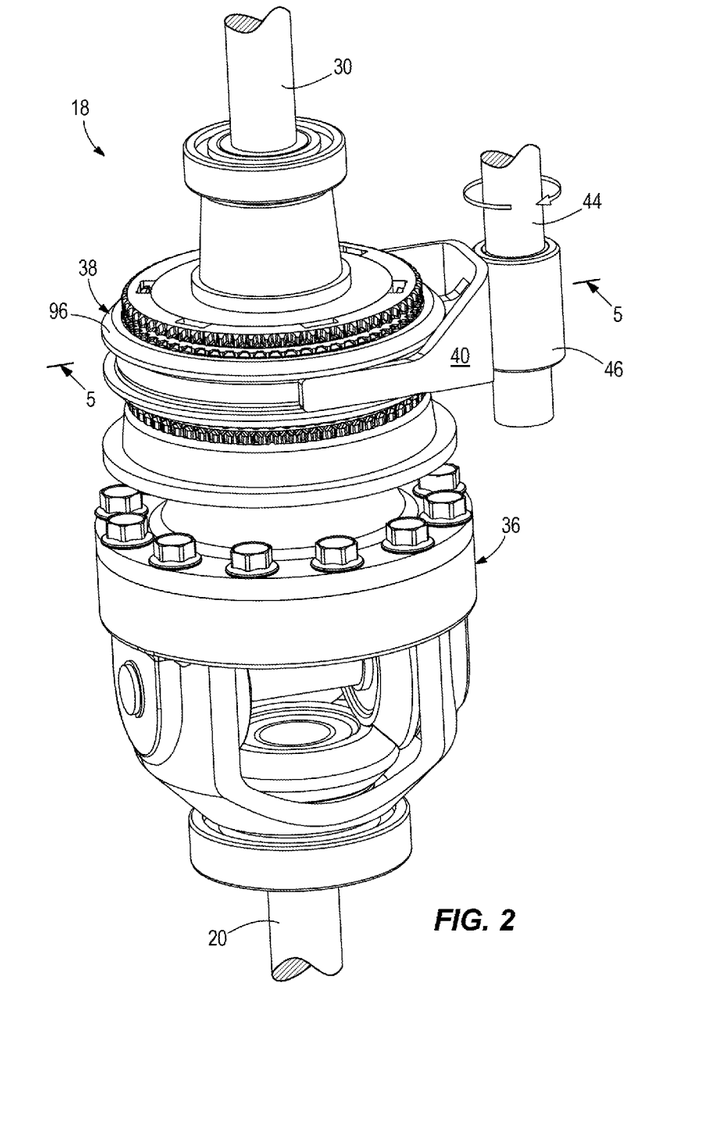
FIG. 2 is a perspective view of a marine transmission constructed in accordance with an exemplary embodiment of the invention.

Referring to FIG. 2, the transmission 18 includes a torque transmitting gear set 36 and a clutch mechanism 38. A shift fork 40 engages a sliding sleeve 96 to shift between forward, neutral and reverse. The clutch mechanism 38 is similar to an automotive type, manual transmission synchronizer. The electromechanical actuator 32 (FIG. 1) is preferably a ball and screw type actuator that rotates shift shaft 44. It is desirable that the electromechanical actuator 32 (FIG. 1) be able to apply at least about 250 lbs. (force) to shift the sliding sleeve 96 for the synchronizer. The collar 46 on the shift fork 40 preferably includes a barrel cam arrangement for raising or lowering the shift fork 40. In order to shift, the boat operator will typically move a shifting handle located near the steering column which in turn provides a signal to an electronic control unit. The electronic control unit will reduce engine load, if necessary, prior to instructing the electromechanical actuator 32 to rotate the shift shaft 44.

Figure 3:
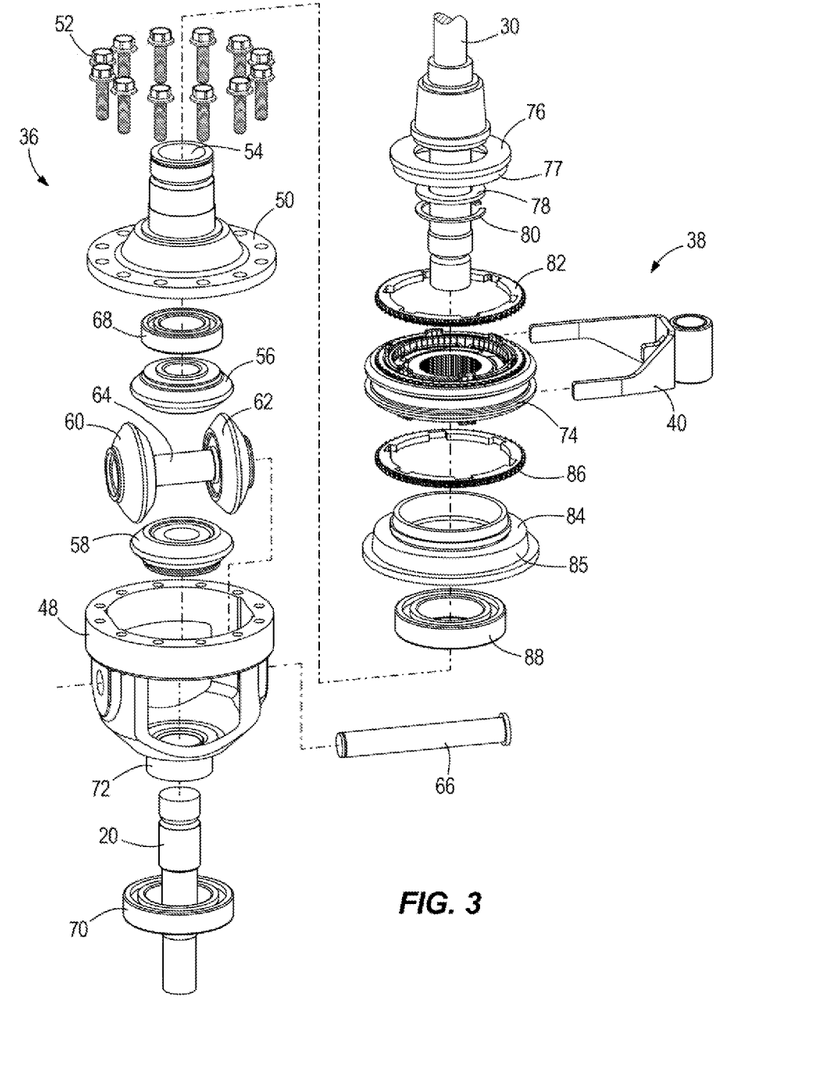
FIG. 3 is an exploded view of the components of the marine propulsion system illustrated in FIG. 2.

Referring now to FIG. 3, the torque transmitting gear set 36 comprises a two-part carrier 48, 50. A carrier body 48 generally houses a set of four bevel gears 56, 58, 60, 62. A carrier flange 50 is fixed to the carrier body 48 with bolts 52 as shown. When assembled, the input drive shaft 30 passes through the cylindrical opening 54 of the carrier flange 50. Top bevel gear 56 is attached to the input drive shaft 30 and rotates in common with the input drive shaft 30. Ball bearing 68 mounts inside of the carrier flange 50 and around the input drive shaft 30 so that the input drive shaft 30 can rotate freely within the carrier flange 50 unless the clutch mechanism 38 is engaged in the forward position. Lower bevel gear 58 is attached to and rotates in common with the output shaft 20. Ball bearing 70 mounts around the lower concentric outlet opening 72 of the carrier body 48 (see for example FIG. 5). The ball bearing 70 is attached directly or indirectly to the drive housing (not shown), and allows the carrier body 48 to rotate freely with respect to the drive housing (not shown) unless the clutch mechanism 38 is shifted into the reverse position. Side idler bevel gears 60, 62 are part of a gear assembly in which the gears 60, 62 are spaced apart by an axle 64. The side idler bevel gears 60, 62 and axle 64 are mounted within the carrier body 48 over pinion shaft 66. As described below in connection with FIGS. 6 and 7, when the clutch mechanism 38 is shifted in the forward direction, the carrier flange 50 and carrier body 48 along with the pinion shaft 66 rotate in unison with the input drive shaft 30 to drive the output shaft 20 in the same direction as the input drive shaft 30 and in 1:1.0 gear ratio. When the clutch mechanism 38 is shifted into the reverse position, however, and the input drive shaft 30 and top bevel gear 56 drive the side idler bevel gears 60, 62 to rotate the lower bevel gear 58 and output shaft 20 in reverse direction. If the top bevel gear 56 and lower bevel gear 58 are symmetrical in size, as shown in the Figures, the reverse gear ratio is 1:1.0. It is possible to change the reverse gear ratio by altering the respective sizes of the top bevel gear 56 and the lower bevel gear 58. Such an arrangement may be accomplished, for example, by mounting the side idle bevel gears independently and at an angle either above or below a plane perpendicular to the input and output shafts.

An exemplary synchronizer assembly is shown generally by reference number 74 in FIG. 3. In order to use the synchronizer assembly 74 in the current system, a forward hub 76 is attached to the input drive shaft 30 and a grounded torque reaction plate 84 is fixed to the drive housing (not shown). The forward hub 76 is mounted on to the input drive shaft 30 and rotates in unison with the input drive shaft 30 at all times. A thrust washer 78 and snap ring 80 are used to mount the input drive shaft 30 against the top of the carrier flange 50 (see FIG. 5). The snap ring 80 also holds the synchronizer hub 90 in a fixed axial opposition along the carrier flange 50. Forward hub includes a friction cone 77 on its downwardly facing surface. A clutch tooth ring 82 with engagement teeth is fixed to the forward hub 76 and rotates in common with the forward hub 76 (and the input drive shaft 30). The grounded torque reaction plate 84 likewise includes a friction cone 85. The friction cone 85 on the grounded torque reaction plate 84 is on an upwardly facing surface. A clutch tooth synchronization ring 86 with engagement teeth is mounted to the torque reaction plate 84. As discussed previously, the grounded torque reaction plate 84 and the clutch tooth synchronization ring 86 with the engagement teeth attached to the torque reaction plate 84 do not rotate with respect to the drive housing (not shown). Ball bearing 88 mounts within the reaction plate 85 and allows the carrier flange 50 to rotate inside of the torque reaction plate 84 (see FIG. 5).

Figure 4:
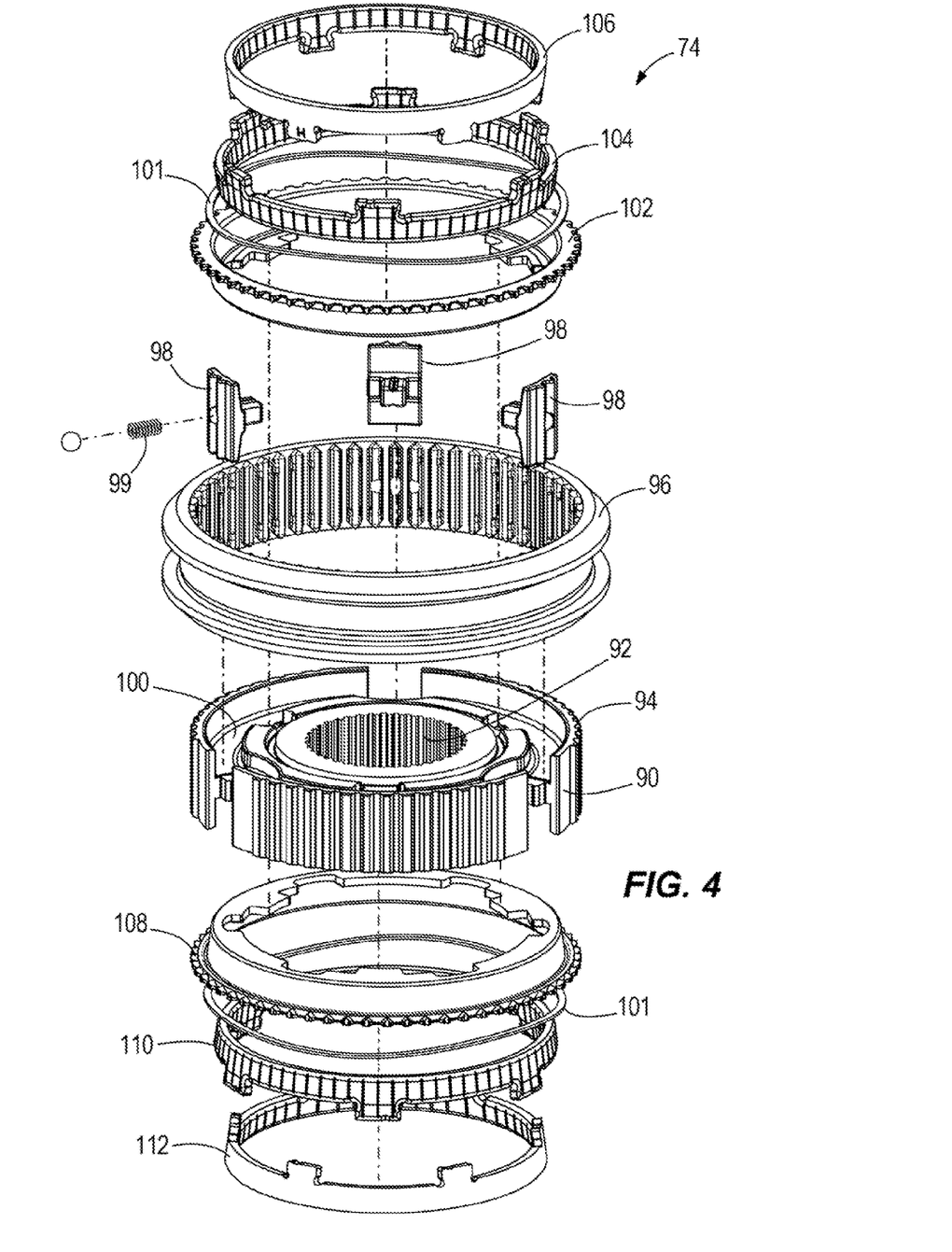
FIG. 4 is an exploded view of the components of a synchronizing clutch mechanism used in accordance with an exemplary embodiment of the invention.

FIG. 4 illustrates the components of the exemplary synchronizer assembly 74 in more detail. Synchronizer hub 90 includes a splined inner opening 92 that mounts the synchronizer hub 90 for common rotation with the carrier flange 50. The synchronizer hub 90 does not move vertically with respect to the carrier flange 50, but is in common rotation with the carrier flange 50. The synchronizer hub 90 includes an outer spline surface or surfaces 94 over which a sliding sleeve 96 is mounted. Struts 98 with a ball and spring detent actuator are attached to the synchronizer hub 90 and interact with detents on the inner surface of the sliding sleeve 96 as is known in the art in order to prevent the sliding sleeve 96 from slipping inadvertently from the neutral position. The synchronizer hub 90 includes an upper well 100 and a lower well (not shown in FIG. 4). A blocker ring 102, an intermediate synchronization ring (double-sided friction ring) 104 and an inner synchronization ring (single-sided friction ring) 106 are held in the upper well 100 as is known in the art. The inner synchronization ring 106 is attached to and rotates with the synchronizer hub 90. The intermediate synchronization ring 104 is attached to and rotates with the forward hub 76. A blocker ring 108, intermediate synchronization ring (double-sided friction ring) 110 and an inner synchronization ring (single-sided friction ring) 112 are held in the lower well on the synchronizer hub 90 also as known in the art. The inner synchronization ring 112 is attached to and rotates with the synchronizer hub 90. The intermediate synchronization ring 110 is attached to the grounded torque reaction plate 85.

Figure 5:
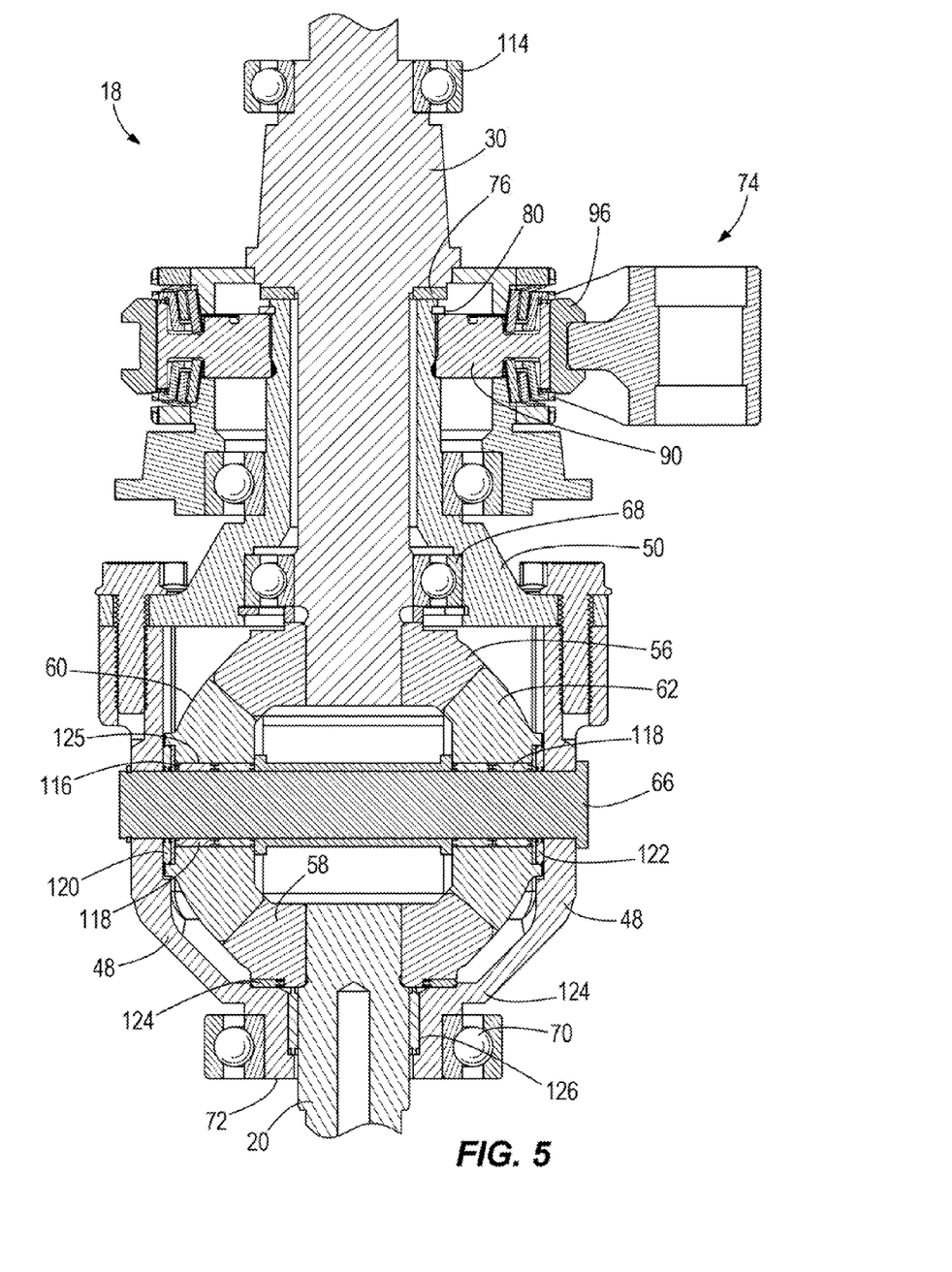
FIG. 5 is a longitudinal section view taken along line 5-5 in FIG. 2 showing the transmission in a neutral position.

FIG. 5 shows a cross-section of the transmission 18 in the neutral position. The input drive shaft 30 through ball bearing 114, which in turn is mounted directly or indirectly to the drive housing (not shown). The input drive shaft 30 and the top bevel gear 56 are able to rotate inside of the carrier flange 50 by way of ball bearing 68. Side bevel gears 60, 62 are mounted on the pinion shaft 66 via needle bearings 116, 118 and thrust bearings 120, 122. The needle bearings 116, 118 and thrust bearings 120, 122 are important to accommodate heavy loads and friction associated with operating the transmission 18 in reverse. The lower bevel gear 58 as mentioned is attached to the output shaft 20 for common rotation with the output shaft 20. Thrust bearings 124 are used to accommodate the loads and friction between the lower bevel gear 58 and the carrier body 48. Needle bearing 126 is used to support the output shaft 20 for rotation within the output opening 72 of the carrier body 48. The loads and friction accommodated by the respective bearings (116, 118, 120, 122, 124, 126) in the torque transmitting gear set 36 are important when the transmission is in the reverse position. When the transmission is in the forward position the loads and friction are negligible.

Figure 6:
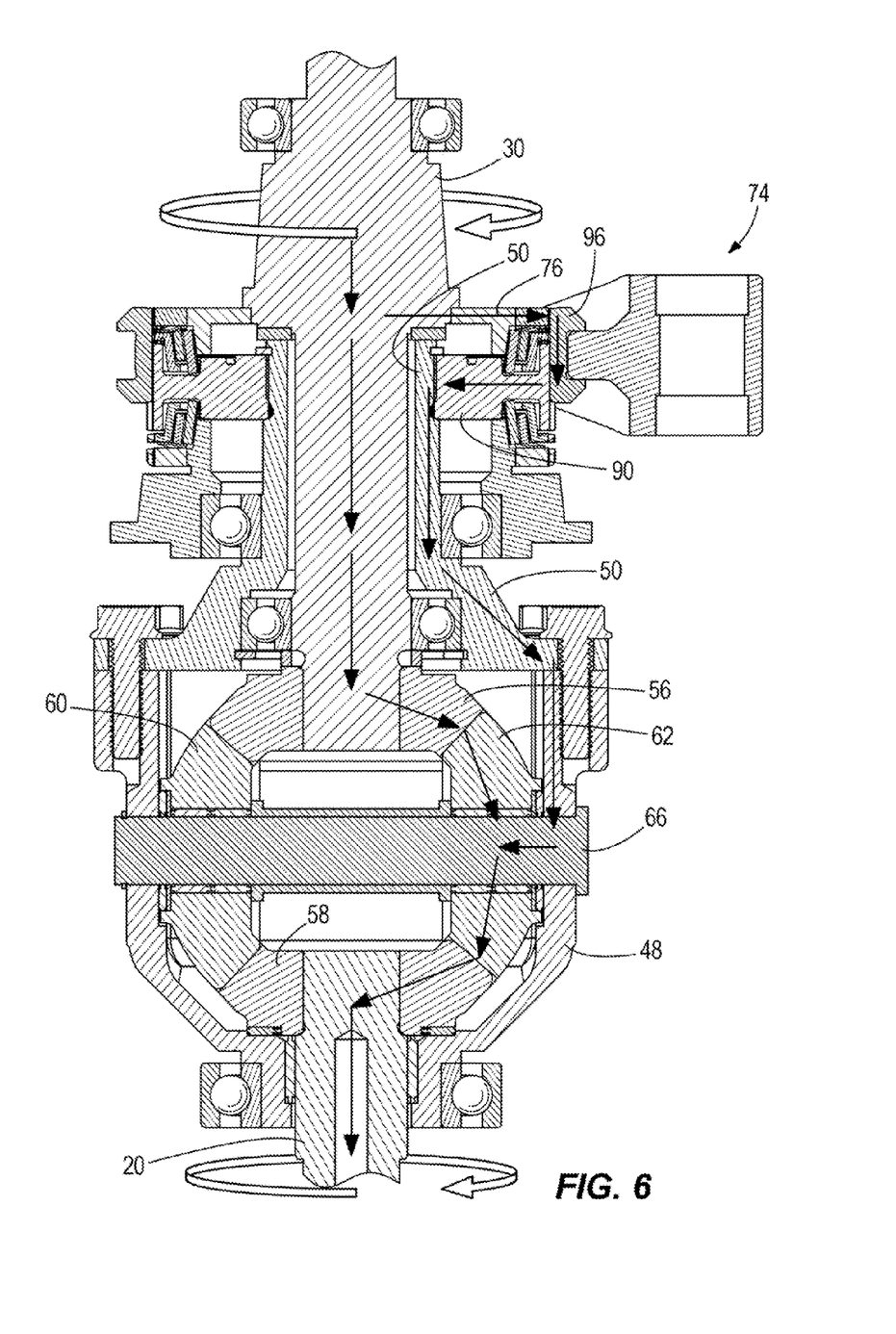
FIG. 6 is a view similar to FIG. 5 showing the transmission shifted into a forward position.

As mentioned, in FIG. 5, the synchronizer assembly 74 is positioned in the neutral position. In FIG. 6, the synchronizer assembly 74 and sliding sleeve 96 have been shifted into the forward position and in FIG. 7 the sliding sleeve 96 has been shifted into the reverse position. Referring in particular to FIG. 6, the sliding sleeve 96 is engaged with the teeth on the forward hub 76 that is connected to the input drive shaft 30. When this occurs, the carrier flange 50 is engaged to rotate in unison with the input drive shaft 30. This means that the carrier body 48 and the pinion shaft 66 will also rotate in unison with the input drive shaft 30. At the same time, the input drive shaft 30 and top bevel gear 56 will drive the side idler bevel gears 60 and 62. The torque flow therefore takes two paths when the sliding sleeve 96 is shifted into the forward position as depicted by the arrows in FIG. 6. One torque path is through the input drive shaft 30 to the top bevel gear 56 and through the side idler bevel gear 60, 62 to the lower bevel gear 58 and the output shaft 20. The other torque path is from the output shaft 20 through the forward hub 76, the sliding sleeve 96, the synchronizer hub 90, the carrier flange 50, the carrier body 48, the pinion shaft 66, and through the side idler bevel gears 60, 62 to bottom bevel gear 58 and the output shaft 20.

Figure 7:
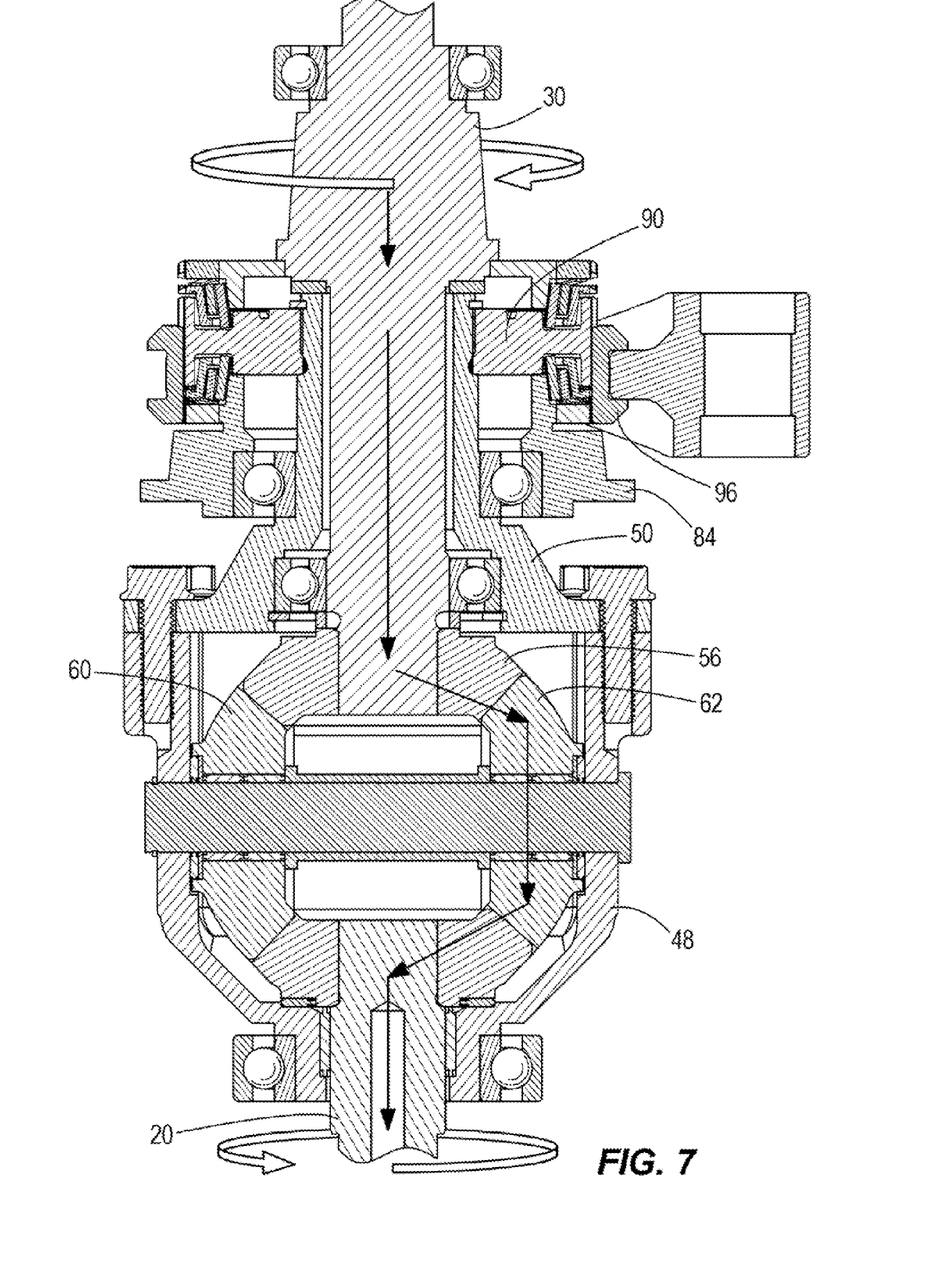
FIG. 7 is a view similar to FIGS. 5 and 6 showing the transmission shifted into a reverse position.

FIG. 7 shows the sliding sleeve 96 shifted into the reverse position. When the sliding sleeve 96 is shifted into the reverse position, the carrier flange 50 is held still with respect to the grounded torque reaction plate 84 via synchronization hub 90 and sliding sleeve 96. In reverse, the carrier flange 50 and carrier body 48 are thus held stationary with respect to the drive housing and the torque path is as shown in FIG. 7. The rotation of the input drive shaft 30 and the upper bevel gear 56 rotates the side idler bevel gears 60, 62 around the pinion shaft 66 which in turn rotates the bottom bevel gear 58 and the output shaft 20 in the opposite direction as the input drive shaft 30.

It has been found useful to bias the blocker rings 108, 102 towards the synchronizer hub 90 with a spring mechanism e.g. wave springs 101 to prevent drag. This can be particularly helpful on the blocker ring for the reverse side of the synchronizer because the synchronizer assembly 74 is mounted on a vertical driveshaft and the blocker ring 108 may fall due to the weight of gravity. The type and configuration of springs 101 can vary from that shown.

It is possible to practice aspects of the invention with a clutch mechanism other than a synchronizing clutch mechanism. For example, dog clutches, cone clutches, and multi-disc clutches are widely used in marine applications and could be used to engage the transmission 18 in forward, neutral and reverse position.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A marine transmission located within a drive housing comprising:
    an input shaft having an axis of rotation and rotated in a given direction by engine torque;
    an output shaft aligned with the axis of rotation of the input shaft;
    a torque transmitting gear set comprising a carrier that is selectively fixed to the input shaft or the drive housing respectively, a pinion shaft rotatably mounted to the carrier transverse to the axis of rotation of the input and output shafts, opposing top and bottom bevel gears mounted in line with the input and output shafts respectively, the top bevel gear being fixed to the input shaft and the bottom bevel gear being fixed to the output shaft, and opposing side idler bevel gears mounted on the pinion shaft transverse to the top and bottom bevel gears and in constant mesh with the top and bottom bevel gears;
    a clutch mechanism operably connected to the torque transmitting gear set; and
    a shifting mechanism for shifting the clutch mechanism between forward, neutral and reverse positions;
    wherein the carrier is fixed relative to the input shaft when the clutch mechanism is fully engaged in the forward position so that the carrier and pinion shaft rotate in the same direction as the input shaft and the side idler bevel gears drive the bottom bevel gear and output shaft in the same direction as the input shaft, and the carrier is fixed relative to the drive housing when the clutch mechanism is fully engaged in the reverse position so that the top bevel gear on the input shaft rotates the side idler gears about the pinion shaft to drive the bottom bevel gear on the output shaft in the opposite direction of the input shaft;
    a forward hub fixed for common rotation with the input shaft, the forward hub including a friction cone and clutch engagement teeth;
    a grounded reaction plate fixed in position relative to the drive housing, the grounded reaction plate including a friction cone and clutch engagement teeth;
    a synchronizer hub that is mounted for common rotation with the carrier, said synchronizer hub being located between the forward hub and the grounded reaction plate;
    said synchronizer hub including a first concentric well in which a first blocker ring and at least one synchronizing ring are held between the synchronizer hub and the forward hub;
    said synchronizer hub including a second concentric well in which a second blocker ring and at least one synchronizing ring are held between the synchronizer hub and the grounded reaction plate;
    a sliding sleeve mounted over the synchronizer hub and movable to engage the clutch engagement teeth on the forward hub when the clutch mechanism is shifted into the forward position and movable to engage the engagement teeth on the grounded reaction plate when the clutch mechanism is shifted into reverse;
    wherein the first blocker ring is also held in the first concentric well and the second blocker ring is also held in the second concentric well; and
    a spring that biases the first blocker ring away from contacting the forward hub when the clutch mechanism is not in the forward position and another spring that biases the second blocker ring away from contacting the grounded reaction plate when the clutch mechanism is not in the reverse position.

2. A marine transmission as recited in claim 1, wherein the output shaft is free to rotate independently from the input shaft when the clutch mechanism is in the neutral position, and the carrier rotates to accommodate differences in angular velocity between the input and output shaft.

3. A marine transmission as recited in claim 1 wherein the carrier includes a carrier body to which the pinion shaft is mounted and a carrier flange connected to the carrier body and arranged such that the clutch mechanism selectively engages the carrier flange to rotate in common with the input shaft when the clutch mechanism is engaged in the forward position.

4. A marine transmission as recited in claim 1, wherein the clutch mechanism selectively engages the clutch engagement teeth on the forward hub when the clutch mechanism is shifted into the forward position and the clutch engagement teeth on the grounded reaction plate when the clutch mechanism is shifted into reverse.

5. A marine transmission as recited in claim 1 wherein the clutch mechanism is mounted concentrically around the input shaft and above the torque transmitting gear set.

6. A marine transmission as recited in claim 1 wherein the top and bottom bevel gears are straight bevel gears.

7. A marine transmission as recited in claim 1 wherein the top and bottom bevel gears are helical bevel gears.

8. A marine transmission as recited in claim 1 wherein the input and output shafts are mounted substantially vertical relative to the drive housing and the output shaft includes a bevel gear at its lower end that is in constant mesh with a right angle bevel gear to transfer torque to a propeller shaft along a rotation axis substantially perpendicular to the rotation axis of the input and output shafts.

9. A marine transmission as recited in claim 1 wherein a gear ratio of the torque transmitting gear set when the marine transmission is in the reverse position is less than or equal to 1:1.0.

10. A marine transmission as recited in claim 1 wherein a gear ratio of the torque transmitting gear set when the marine transmission is in the reverse position is greater than or equal to 1:1.0.

11. A marine transmission as recited in claim 1 further comprising needle bearings between the pinion shaft and the side idler bevel gears.

12. A marine transmission as recited in claim 1 further comprising a needle bearing between the output shaft and the carrier.

13. A marine transmission as recited in claim 1 further comprising thrust bearings around the pinion shaft between respective side idler bevel gears and the carrier.

* * * * *